US006629727B2

(12) United States Patent
Asbach et al.

(10) Patent No.: US 6,629,727 B2
(45) Date of Patent: Oct. 7, 2003

(54) INFANT SUPPORT WITH ENTERTAINMENT DEVICE

(75) Inventors: Ronald M. Asbach, Grand Island, NY (US); Curt Jonathan Mahlstedt, Orchard Park, NY (US)

(73) Assignee: Mattel, Inc., El Segundo, CA (US)

( * ) Notice: Subject to any disclaimer, the term of this patent is extended or adjusted under 35 U.S.C. 154(b) by 0 days.

(21) Appl. No.: 09/971,003

(22) Filed: Oct. 5, 2001

(65) Prior Publication Data

US 2003/0067199 A1 Apr. 10, 2003

(51) Int. Cl.⁷ .................... A47C 7/62; A63H 33/00
(52) U.S. Cl. ............... 297/188.21; 297/DIG. 11; 297/188.2; 297/188.06; 446/227
(58) Field of Search ............... 297/188.06, 188.2, 297/188.21, DIG. 11; 248/227.4, 230.5, 231.61; 446/227, 228, 229; 5/658

(56) References Cited

U.S. PATENT DOCUMENTS

| | | |
|---|---|---|
| 1,574,226 A | 2/1926 | Ackermann |
| 1,634,162 A | 6/1927 | Tesk |
| 1,806,773 A | 5/1931 | Waters |
| 2,452,749 A | 11/1948 | Guden |
| 2,490,230 A | 12/1949 | Riegel |
| 2,686,030 A | 8/1954 | Johnson |
| 2,858,641 A | 11/1958 | Trimble |
| 3,014,307 A | 12/1961 | Dupuis |
| 3,180,600 A | 4/1965 | Kopec |
| 4,207,696 A | 6/1980 | Hyman et al. |
| 4,640,034 A | 2/1987 | Zisholtz |
| 4,865,380 A | 9/1989 | Heitzman-Powell et al. |
| 5,187,826 A * | 2/1993 | Mariol .................. 297/295 |
| 5,301,999 A | 4/1994 | Thompson et al. |
| 5,360,258 A | 11/1994 | Alivizatos |
| 5,370,570 A | 12/1994 | Harris |
| 5,451,095 A * | 9/1995 | Riback .................. 297/19 |
| 5,509,721 A * | 4/1996 | Huang ................. 297/188.1 |
| 5,664,746 A | 9/1997 | Benzakarya |
| 5,672,088 A | 9/1997 | Chininis |
| 5,887,945 A * | 3/1999 | Sedlack ................ 280/47.25 |
| 5,951,360 A | 9/1999 | Fearon et al. |
| 6,170,910 B1 | 1/2001 | Bapst |
| D461,854 S * | 8/2002 | Myers ................... D21/467 |
| D468,544 S | 1/2003 | Myers |
| 2002/0002741 A1 * | 1/2002 | Tomas et al. .............. 5/101 |
| 2003/0020317 A1 * | 1/2003 | Keegan et al. ........... 297/446.2 |

FOREIGN PATENT DOCUMENTS

| | | |
|---|---|---|
| GB | 2 216 428 A | 10/1989 |
| GB | 2 279 265 A | 1/1995 |

* cited by examiner

Primary Examiner—Peter M. Cuomo
Assistant Examiner—Sarah C. Burnham
(74) Attorney, Agent, or Firm—Cooley Godward LLP

(57) ABSTRACT

The present invention provides support assembly having a resilient support frame having a ground engaging portion and an upper portion. The upper portion is moveable with respect to the ground engaging portion. A suspension assembly is coupled to the upper portion of the support frame such that motion of the upper portion imparts motion to the suspension assembly. In another aspect of the invention, the invention includes a seat supported on a resilient support frame having a ground engaging portion and an upper portion moveable with respect to the ground engaging portion. A mobile is coupled to the upper portion such that motion of the upper portion imparts a corresponding motion to the mobile.

17 Claims, 4 Drawing Sheets

INFANT SUPPORT WITH ENTERTAINMENT DEVICE

BACKGROUND

1. Field of the Invention

The present invention relates generally to infant support seats, and more particularly to an infant support seat with an attached mobile.

2. Discussion of the Related Art

Conventional infant support seats provide support for infants who are unable to support themselves in an upright position. Typically, the support seats provide some sort of stimulation for the infant in the form of vibration or music. Many infant support seats are also supported by resilient frames that flex under an infant's weight and provide soothing bouncing or rocking motion with the infant in the seat.

Additionally, there are infant seats that incorporate a bar or similar structure that arches over the seat and is configured to suspend toys to stimulate the infant in the seat. Such toy bars are typically removably coupled to opposite sides of the support seat frame. With the toy bar in place, it is difficult to place an infant in the seat, and likewise, difficult to remove the infant from the seat. Removal and replacement of the toy bar can be burdensome, especially when holding an infant.

Thus, there is a need for an infant seat that includes an entertainment device, such as a mobile, that is selectively positioned above the infant seat so that an infant may be easily placed in and removed from the seat without detaching the entertainment device.

SUMMARY OF THE INVENTION

The present invention solves the problems with, and overcomes the disadvantages of, conventional infant seats. In particular, the present invention relates to an infant seat that has an attached entertainment device that is selectively positionable above the seat.

The invention includes a resilient support frame having a ground engaging portion and an upper portion. The upper portion is moveable with respect to the ground engaging portion. A suspension assembly is coupled to the upper portion of the support frame such that motion of the upper portion imparts motion to the suspension assembly.

In another aspect of the invention, the invention includes a seat supported on a resilient support frame having a ground engaging portion and an upper portion moveable with respect to the ground engaging portion. A mobile is coupled to the upper portion such that motion of the upper portion imparts a corresponding motion to the mobile.

These and other aspects of the present invention will become apparent from the following drawings and description.

BRIEF DESCRIPTION OF THE DRAWINGS

The present invention is described with reference to the accompanying drawings. In the drawings, like reference numbers indicate identical or functionally similar elements.

DETAILED DESCRIPTION

Figure 1:
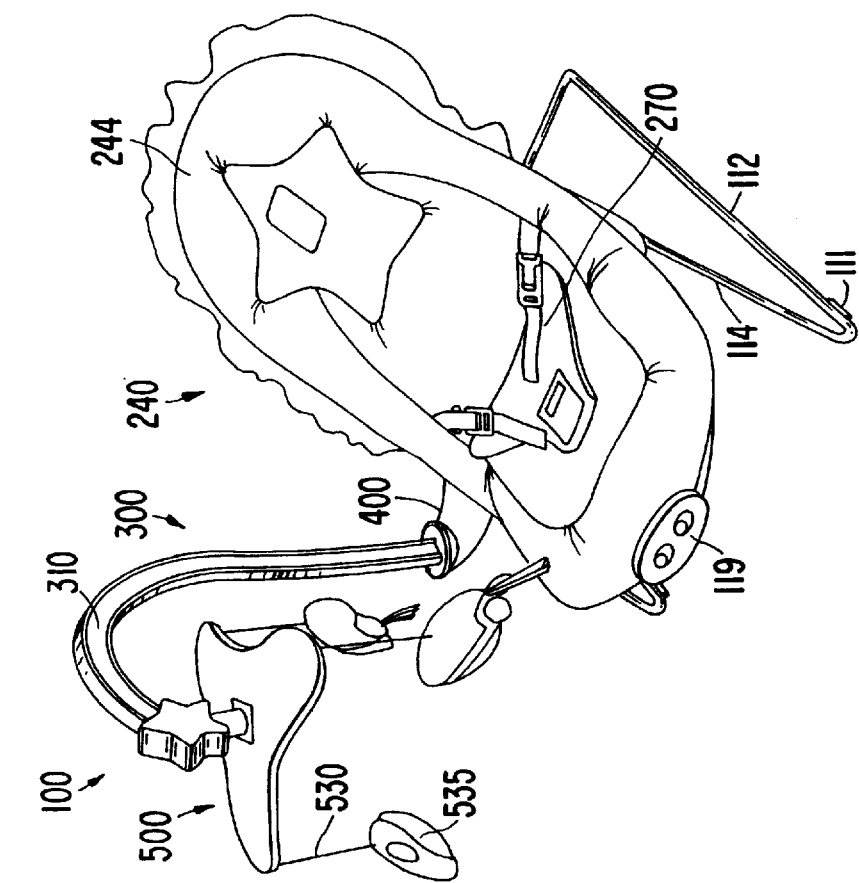
FIG. 1 is a perspective view of one embodiment of a support assembly with an attached entertainment device embodying the principles of the present invention.

FIGS. 1–6 illustrate one embodiment of an infant support assembly 100. The infant support assembly 100 includes a support frame 110, a seat 240, a suspension assembly 300, and an entertainment device 500.

The support frame 110 is a generally peripheral frame and includes a ground-engaging base member 112 that is configured to elevate the seat 240 above a supporting surface. An upper portion 114 is coupled to the base member 112 and is configured to support the seat 240 in an inclined position relative to the supporting surface. The upper portion 114 includes a leg support 116 that is coupled above the base member 112 and is configured to support a portion of the seat 240 in a forwardly extended position. The upper portion 114 of the frame 110, including leg support 116, is movable with respect to the ground engaging portion or base 112 to provide a bouncing or rocking motion to soothe the infant positioned in the seat 240.

A stimulation device 119 may be attached to the leg support 116 to provide stimulation for an infant in the seat. The stimulation device 119 may include a vibrator or music producing apparatus or any combination thereof as would be known to the skilled artisan.

The support frame 110 can include feet 111 located on the base member 112 to engage the supporting surface to inhibit the support assembly 100 from sliding.

The seat 240 is substantially elliptical or oval in plan view and includes an upper seating surface 242 upon which an infant can be positioned and a lower foot portion 244 adjacent the upper seating surface 242. The foot portion 244 and the seating surface 242 may be integrally formed or removably coupled. The seat 240 is coupled to the frame 110 according to conventional methods known to the skilled artisan.

To maintain the infant securely in seat 240, a belt 270 is coupled to the seat 240. The belt 270 is provided with separable buckles for easy operation. Any infant restraint device known to the skilled artisan may be utilized with the seat 240 without departing from the scope of the invention.

A suspension assembly 300 is coupled to the upper portion 114 of the frame 110 such that motion of the upper portion 114 imparts a motion to the suspension assembly 300. As will be apparent, the configuration of the support assembly 300 (described in detail below) allows the translating motion of the support assembly 300 to result in a rotating motion of the entertainment device 500.

Figure 3:
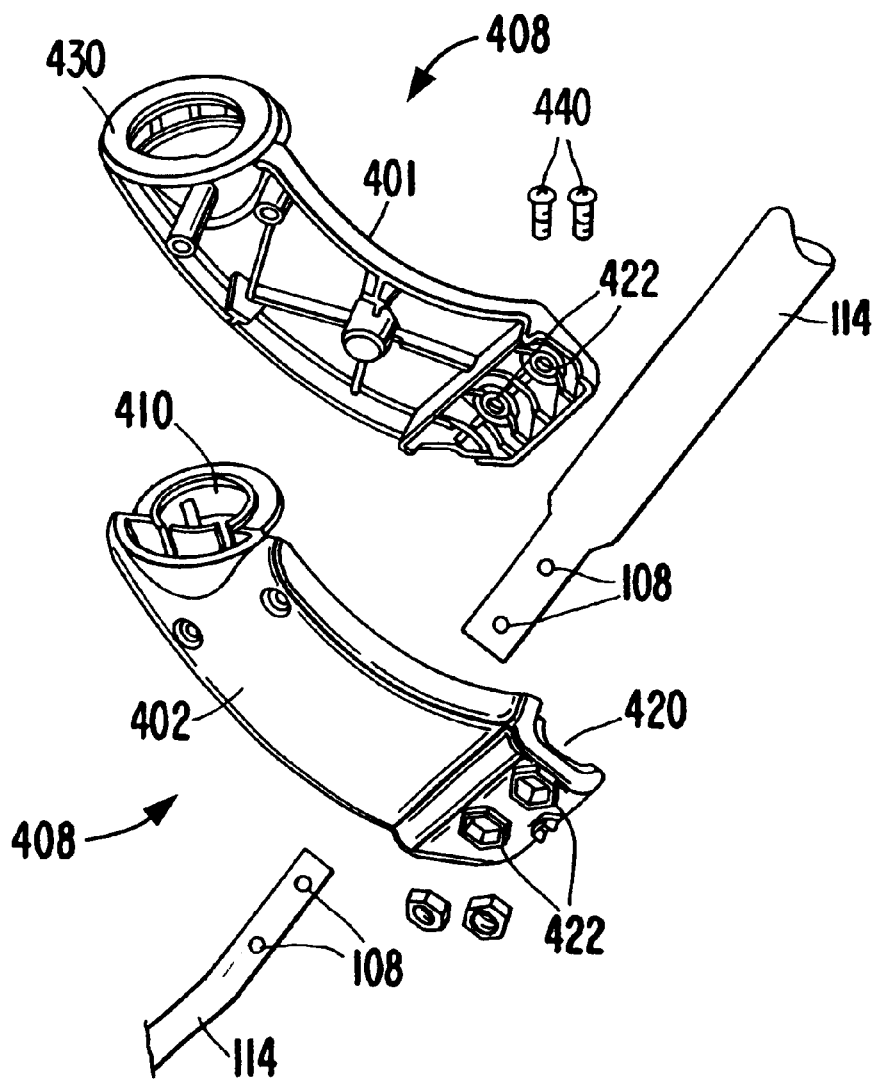
FIG. 3 is an exploded view of detail A in FIG. 1.

The suspension assembly 300 is coupled to one of a pair of opposing sides of the unshaped upper portion 114 of frame 110. The suspension assembly 300 includes a mount or mounting bracket 400 that is coupleable to the upper portion 114 of the support frame 110 and a support arm 310 pivotably coupled to the mount 400. As best seen in FIG. 3, mount 400 includes a first side 401 and a second side 402, which together form a channel 420 for receiving the upper portion 114 of the frame 110. The first and second sides of mounting bracket 400 include openings 422 that receive nuts and bolts 440 to maintain the position of the mount 400 on the support frame 110. Similarly, upper portion 114 and lower portion 112 of the frame 110 include openings 108, 118 respectively that are in registry with openings 422 when the infant support assembly 100 is in the assembled configuration. As can be appreciated, the nuts and bolts 440 can be utilized to secure the upper and lower portion of the frame 110 regardless of whether the mounting bracket 400 is attached. Any other suitable fastener may be used to couple the upper and lower portion of frame 110 and/or to couple mounting bracket 400 to upper portion 114.

Figure 2:
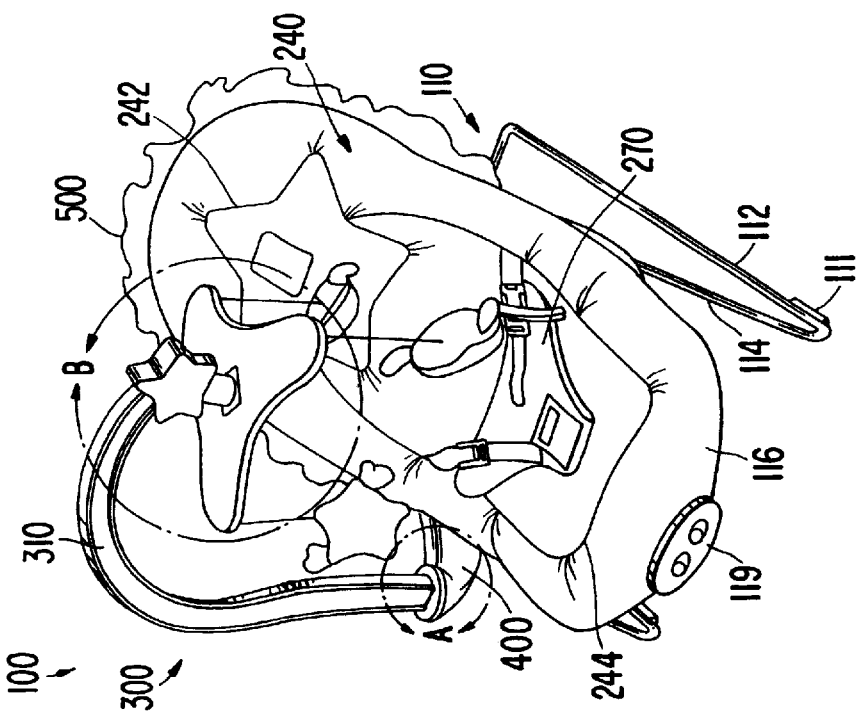
FIG. 2 is a perspective view of the support assembly illustrated in FIG. 1 with the entertainment device positioned away from the support assembly.

The suspension assembly 300 is movable with respect to the mounting bracket between a first position in which the entertainment device 500 is disposed above an infant positioned on the upper seating surface 242, (as illustrated in FIG. 1) and a second position in which the entertainment device 500 is disposed away from the infant (as illustrated in FIG. 2).

Figure 4:
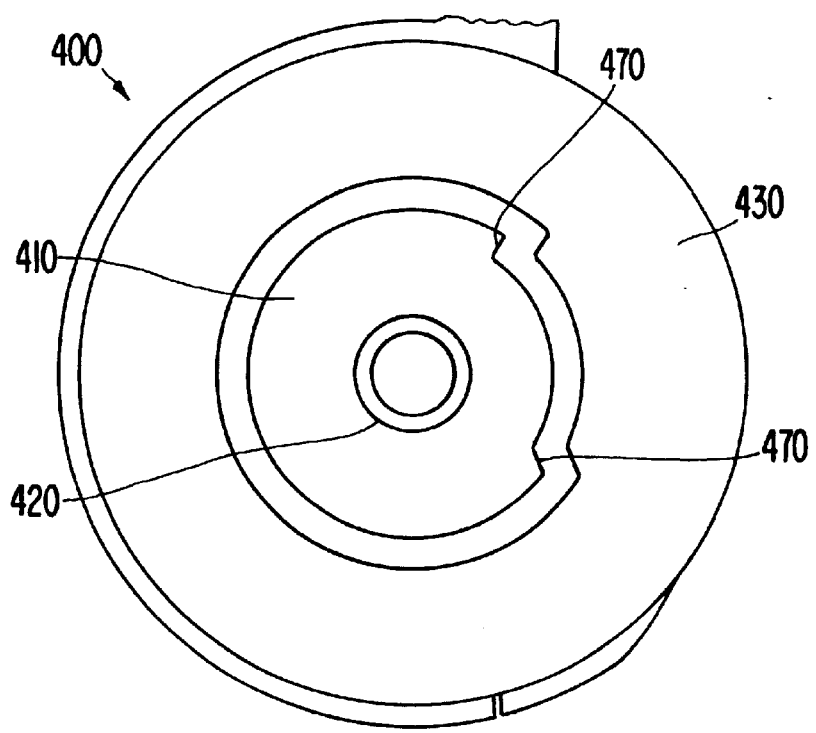
FIG. 4 is a top plan view of a socket of the mounting bracket of the suspension assembly embodying the principles of the present invention.
Figure 5:
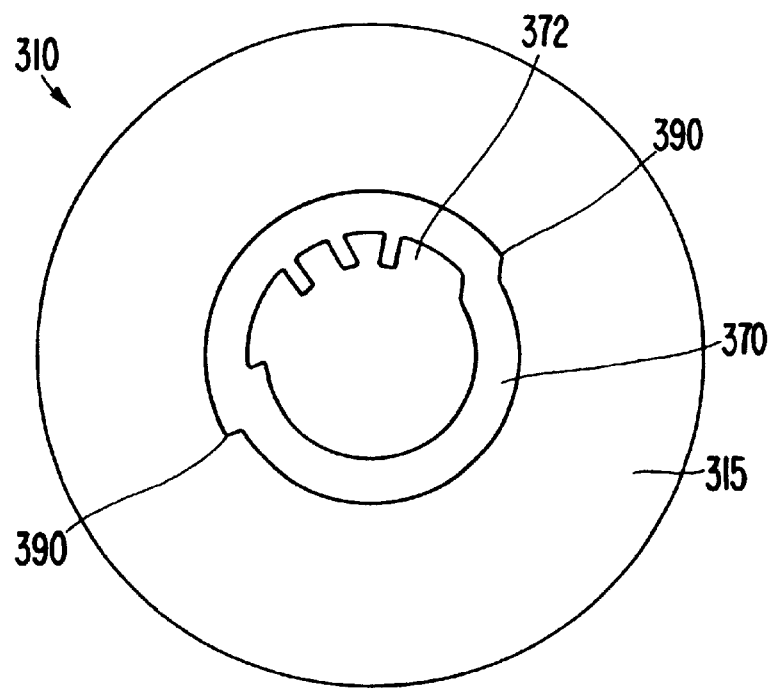
FIG. 5 is a bottom plan view of an end post of the support arm of suspension assembly embodying the principles of the present invention.

The mounting bracket 400 includes a body 408 that extends from the frame 110 and terminates in a socket 410 that receives support arm 310. As best seen in FIG. 4, socket 410 includes a post 420 to guide the support arm 310 into position. The mounting bracket 400 includes a face 430 that is adjacent a face 315 of the support arm 310 when in the assembled configuration. As best seen in FIG. 5, support arm 310 includes a post 370 that mates with socket 410 to maintain the support arm in an upright configuration. The post 370 is able to rotate within socket 410 along an arc defined by stop surfaces 470 in the socket 410 and stop surfaces 390 on the post 370.

In the illustrated embodiment, the mounting bracket 400 is positioned on the upper portion 114 of the frame 110 adjacent the seat 240, between the upper seating surface 242 and the lower foot portion 244. It will be appreciated that the mounting bracket can be positioned at any point along the upper portion 114 of the frame 110 provided that motion of the upper portion 114 imparts a motion to the support arm 310 of the suspension assembly 300. Alternatively, mounting bracket 400 could be coupled to leg support 116.

Further, in the illustrated embodiment, the support arm 310 is pivotably connected with respect to the mounting bracket 400 about an axis disposed at an acute angle with respect to the upper portion of the frame engaged by the connector 400. Accordingly, the support arm 310 extends upwardly in a direction perpendicular to the supporting surface, in a position best viewed by the infant positioned in the seat 240.

Figure 6:
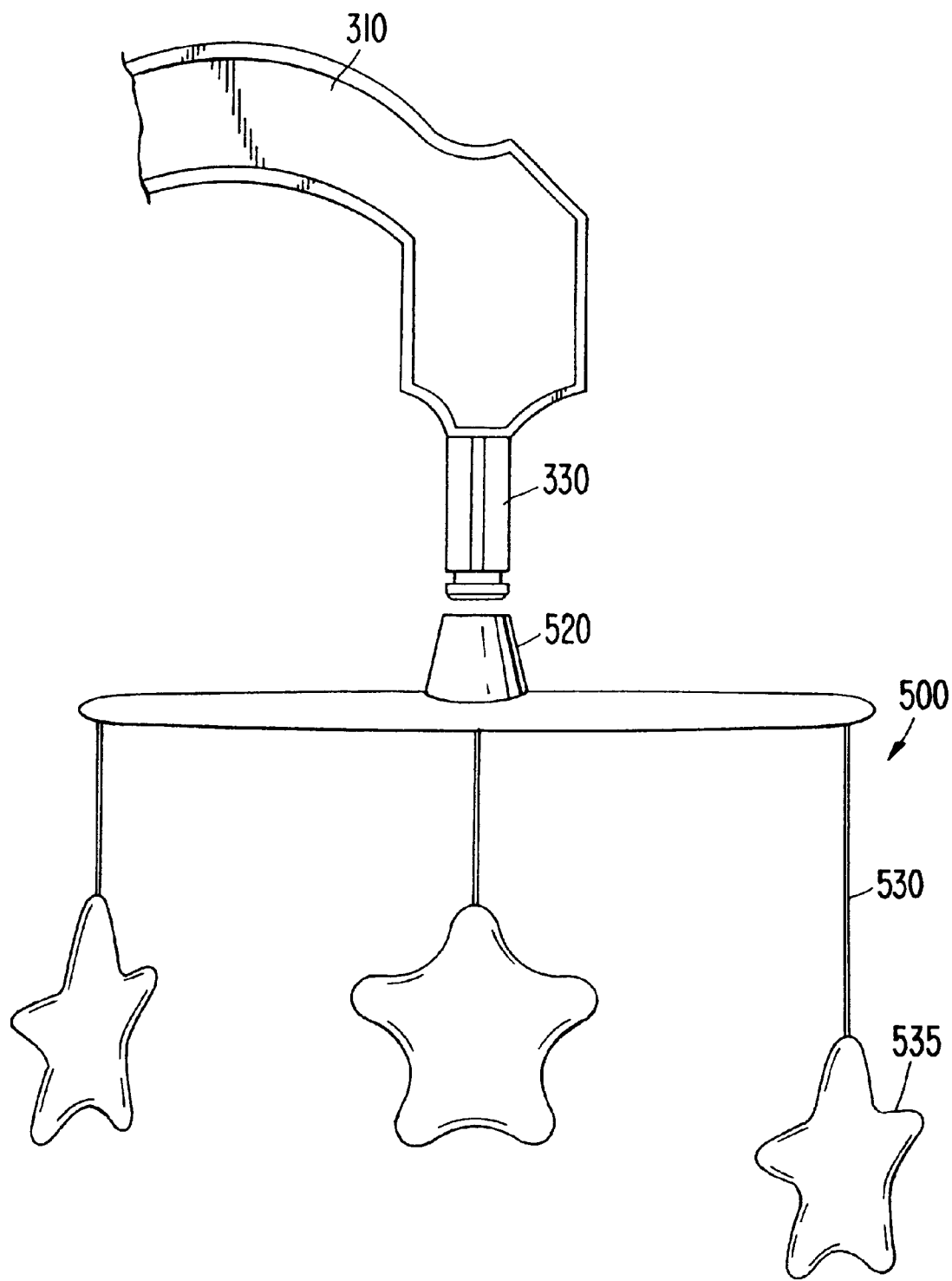
FIG. 6 is an exploded view of detail B in FIG. 1.

The support arm 310 is able to suspend an entertainment device 500 above an infant positioned on the seat 240. As best illustrated in FIG. 6, the support arm 310 terminates at its uppermost end in a post 330 that mates with an opening 525 of a collar on the entertainment device 500. In the illustrated embodiment, the entertainment device 500 is configured as a mobile that rotates about post 330 when the upper portion 114 of the frame 110 is moved with respect to the ground engaging portion 112 of the frame 110. The mobile 500 includes fasteners 530 which support articles 535 that are pleasing and/or soothing to an infant positioned in the seat.

In the illustrated embodiment, support arm 310 extends upwardly from connector or mounting bracket 400 and terminates in a downward direction facing the seat 240. This configuration, along with the flexibility of the support arm 310, allows the desired movement of the entertainment device 500.

As described above, articles 535 are suspended from fasteners 530. The articles may be fixedly coupled to fasteners 530 or may be removably attached by hook and loop type fasteners, mating rings, loops, snaps, buckles, etc.

In use, when an adult user desires to position an infant in the seat 240 or remove an infant from the seat 240, the support arm 310 may be pivoted to its second position as illustrated in FIG. 2. When an infant is positioned in the seat 240, the adult user can pivot the support arm 310 such that entertainment device 500 is positioned above the infant positioned in the seat.

While particular, illustrative embodiments of the invention have been described, numerous variations and modifications exist that would not depart from the scope of the invention. For example, mount 400, as described above, can be attached to the frame by screws as illustrated. However, any connector that enables the support arm 310 to be pivotally coupled to the frame 110 would be appropriate.

The attachment of the entertainment device 500 is described above as being rotatably coupled to the support arm. Alternatively, the entertainment device 500 may be fixedly coupled or coupled to a swivel connector. Additionally, entertainment device 500 need not be configured as a mobile. Entertainment device 500 may take many configurations known to those skilled in the art that are soothing and/or entertaining to children. For example, entertainment device may be a static figure that produces lights and/or sounds.

The various features of the invention have been described in relation to an infant bouncer seat. However it will be appreciated that many of the features, such as the connector and the entertainment device may also be implemented on various infant support devices including car seats, swings, high chairs, etc. Moreover, variations and modifications exist that would not depart from the scope of the invention. A number of these variations have been set forth above.

CONCLUSION

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

The previous description of the preferred embodiments is provided to enable any person skilled in the art to make or use the present invention. While the invention has been particularly shown and described with reference to preferred embodiments thereof, it will be understood by those skilled in the art that various changes in form and details may be made therein without departing from the spirit and scope of the invention.

What is claimed is:

1. A support assembly for an infant, comprising:
   a resilient support frame having a ground engaging portion and an upper portion, said upper portion including a u-shaped member having two opposing sides and being moveable with respect to the ground engaging portion; and
   a suspension assembly being coupled to only one of the opposing sides and having
      a mount coupled to said upper portion of said support frame; and
      a support arm pivotally coupled to said mount, such that motion of said upper portion imparts motion to said suspension assembly.

2. The support assembly of claim 1, wherein said mount includes a first portion and a second portion, together defining a channel configured to receive said upper portion of said support frame.

3. The support assembly of claim 2, said mount further including a socket defined by said first portion and said second portion and configured to receive said support arm.

4. The support assembly of claim 1, further comprising an entertainment device suspended from said support arm.

5. The support assembly of claim 1, further comprising an entertainment device coupled to said suspension assembly, said suspension assembly moveable between a first position disposed above said support frame and a second position disposed away from said support frame;

said entertainment device being positioned over said support frame when said suspension assembly is in said first position.

6. A seat and mobile combination, comprising:

a seat supported on a resilient support frame, said frame having a ground engaging portion and an upper portion, said upper portion including a u-shaped member having two opposing sides and being moveable with respect to the ground engaging portion; and a mobile coupled to only one of the opposing sides of the upper portion by a pivotable connector such that motion of said upper portion imparts a corresponding motion to said mobile, the pivotable connector having a mounting bracket configured to be rigidly coupled to said upper portion of said support frame; and a support arm pivotally coupled to said mounting bracket.

7. The seat and mobile combination of claim 6, wherein said mounting bracket includes a first portion and a second portion, together defining a channel configured to receive said upper portion of said support frame.

8. The seat and mobile combination of claim 7, said mounting bracket further including a socket defined by said first portion and said second portion and configured to receive said support arm.

9. The seat and mobile combination of claim 6, further comprising an entertainment device suspended from said support arm.

10. The seat and mobile combination of claim 6, wherein said mobile is moveable between a first position disposed above said support frame and a second position disposed away from said support frame.

11. A support assembly for an infant, comprising:

a support frame;

a seat supported on the support frame and having an upper seating surface upon which an infant can be positioned and a lower foot portion adjacent the upper seating surface; and a mobile pivotally coupled to the support frame between the upper seating surface and the lower foot portion, said mobile being pivotable about a vertical axis between a first position disposed above the upper seating surface and a second position disposed away from, and coupled to, the upper seating surface.

12. The support assembly of claim 11, wherein said mobile is pivotally coupled to the support frame by a connector having a mounting bracket; and a support arm pivotally coupled to said mounting bracket.

13. An apparatus, comprising:

a connector configured to receive a portion of a frame of a support assembly for an infant;

a support arm pivotally coupleable to said connector to extend upwardly from said connector, said support arm being pivotable with respect to said connector about an axis disposed at an acute angle with respect to the portion of the frame received by the connector; and a mobile coupled to said support arm to be suspended from said support arm.

14. The apparatus of claim 13, wherein said support arm is moveable between a first orientation disposed opposite the frame and a second orientation disposed away from the frame, said mobile being positioned opposite the frame when the support arm is in said first position.

15. The apparatus of claim 13, wherein said support arm is pivotable about a vertical axis with respect to said connector.

16. The support assembly of claim 1, wherein said support arm is pivotable about a vertical axis with respect to said mount.

17. The seat and mobile combination of claim 6, wherein said support arm is pivotable about a vertical axis with respect to said mounting bracket.

\* \* \* \* \*